United States Patent [19]

Sikora

[11] Patent Number: 4,520,907
[45] Date of Patent: Jun. 4, 1985

[54] MECHANICAL-EMERGENCY SYSTEM BETWEEN VEHICLE SERVICE BRAKE FOOT PEDAL AND PARKING BRAKE

[76] Inventor: Joseph G. Sikora, R.D. #3, Box 218, Pottstown, Pa. 19464

[21] Appl. No.: 473,968

[22] Filed: Mar. 10, 1983

[51] Int. Cl.³ .................. F16D 65/36; B60T 13/02
[52] U.S. Cl. .................. 188/156; 188/163; 188/151 A; 303/3
[58] Field of Search .......... 303/2, 3, 56; 188/156, 188/158, 162, 163, 151 A; 74/512; 92/67 R, 66

[56] References Cited

U.S. PATENT DOCUMENTS

| | | | |
|---|---|---|---|
| 2,253,431 | 8/1941 | Johansen | 192/66 |
| 2,848,905 | 8/1958 | Evans | 192/67 R |
| 3,093,213 | 6/1963 | Limoges et al. | 303/3 |

FOREIGN PATENT DOCUMENTS

| | | | |
|---|---|---|---|
| 359033 | 10/1931 | United Kingdom | 188/156 |
| 958181 | 9/1982 | U.S.S.R. | 303/56 |

Primary Examiner—George E. A. Halvosa
Assistant Examiner—Alvin Oberley
Attorney, Agent, or Firm—Robert K. Youtie

[57] ABSTRACT

An emergency brake system for a vehicle, the system including an actuator rotatable upon operation of the service brake, a follower rotatable coaxially with the actuator and normally maintained out of the path of actuator movement, and a sensor sensing malfunction of the service brake to shift the follower into the path of actuator movement, the follower being connected to the parking brake for operation of the latter by the actuator in response to a service brake malfunction.

2 Claims, 4 Drawing Figures

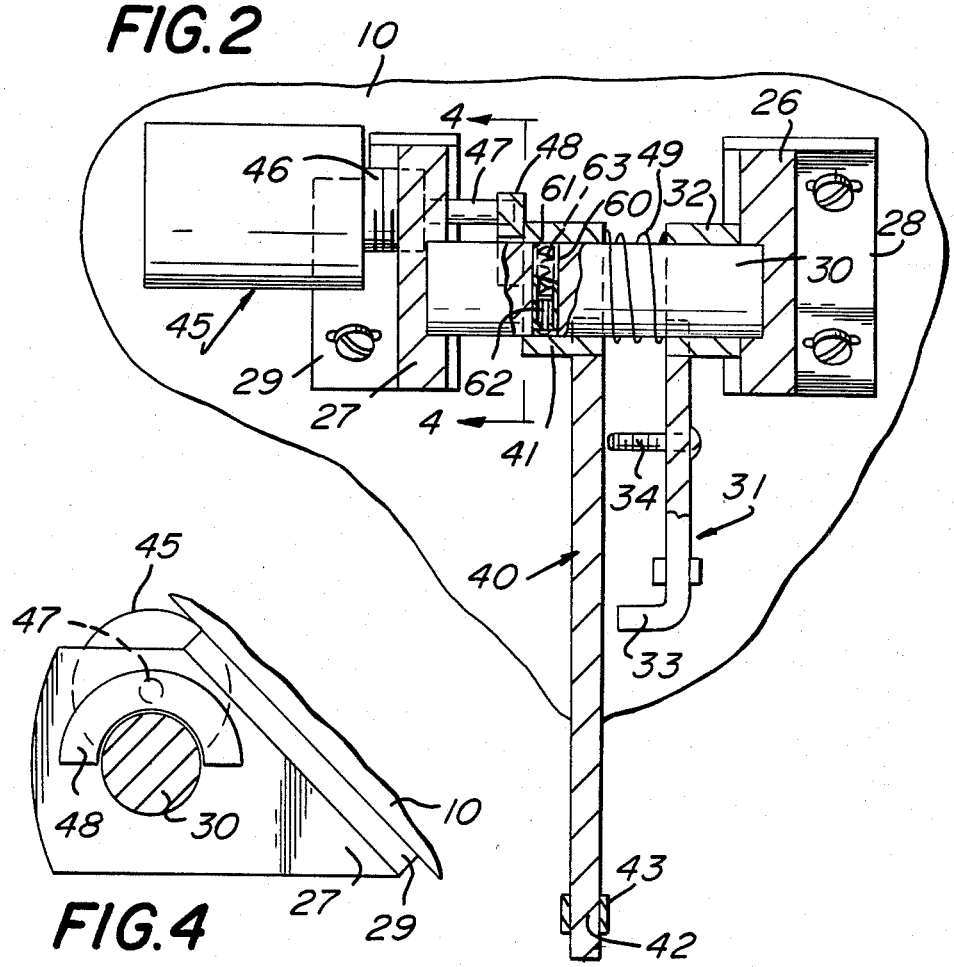
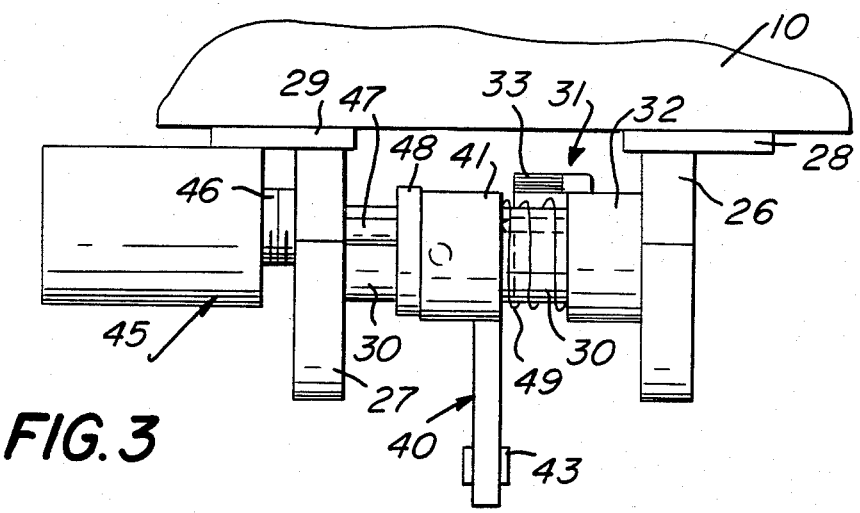

4,520,907

MECHANICAL-EMERGENCY SYSTEM BETWEEN VEHICLE SERVICE BRAKE FOOT PEDAL AND PARKING BRAKE

BACKGROUND OF THE INVENTION

In the art of automobile braking systems, it is common now to provide dual systems so that a brake failure will only be partial, rather than complete. Of course, this affords only partial braking effectiveness. Of course, failure of the seals may result in complete failure of the hydraulic braking system. Also there are provided separate mechanical parking or emergency brake systems, which may slightly impede or delay emergency actuation. Also, a wide variety of automatically operable backup systems have been proposed, but these have not been found satisfactory and have not met with wide acceptance. Applicant is aware of the below listed prior patents:

| U.S. PAT. NO. | PATENTEE |
|---|---|
| 2,116,882 | DICKEY |
| 3,333,902 | LIVERANCE ET AL. |
| 3,424,281 | KAWABE ET AL. |
| 3,436,126 | MOUSLEY |
| 3,582,150 | WILLIAMS |
| 3,650,568 | POPLAWSKI |
| 3,858,944 | POCOBELLO ET AL. |

SUMMARY OF THE INVENTION

It is an important object of the present invention to provide an emergency braking system for use in conjunction with a conventional automotive braking system, upon failure of the latter, to immediately interconnect the service brake operator with the mechanical parking brake system, to afford a gradual application and release or pumping action of the parking brake rather than the ratcheting action of the conventional mechanical brake system.

It is a further object of the present invention to provide an emergency braking system having the advantageous characteristics mentioned in the preceding paragraph, wherein operation is automatically effected without conscious emergency operation by the operator, but which permits of conventional service brake and parking brake operation in both normal and emergency operating conditions.

It is a further object of the present invention to provide an emergency braking system of the type described which is extremely simple in construction, highly reliable in operation throughout a long useful life, capable of economic incorporation in motor vehicles, both as original or after market equipment, all at a reasonable cost.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 2 is an enlarged sectional elevational view taken generally along the line 2—2 of FIG. 1, showing the stucture in greater detail.

FIG. 3 is a plan view showing the structure of FIG. 2.

FIG. 4 is a transverse sectional elevational view taken generally along the line 4—4 of FIG. 2.

DESCRIPTION OF THE PREFERRED EMBODIMENT

Figure 1:
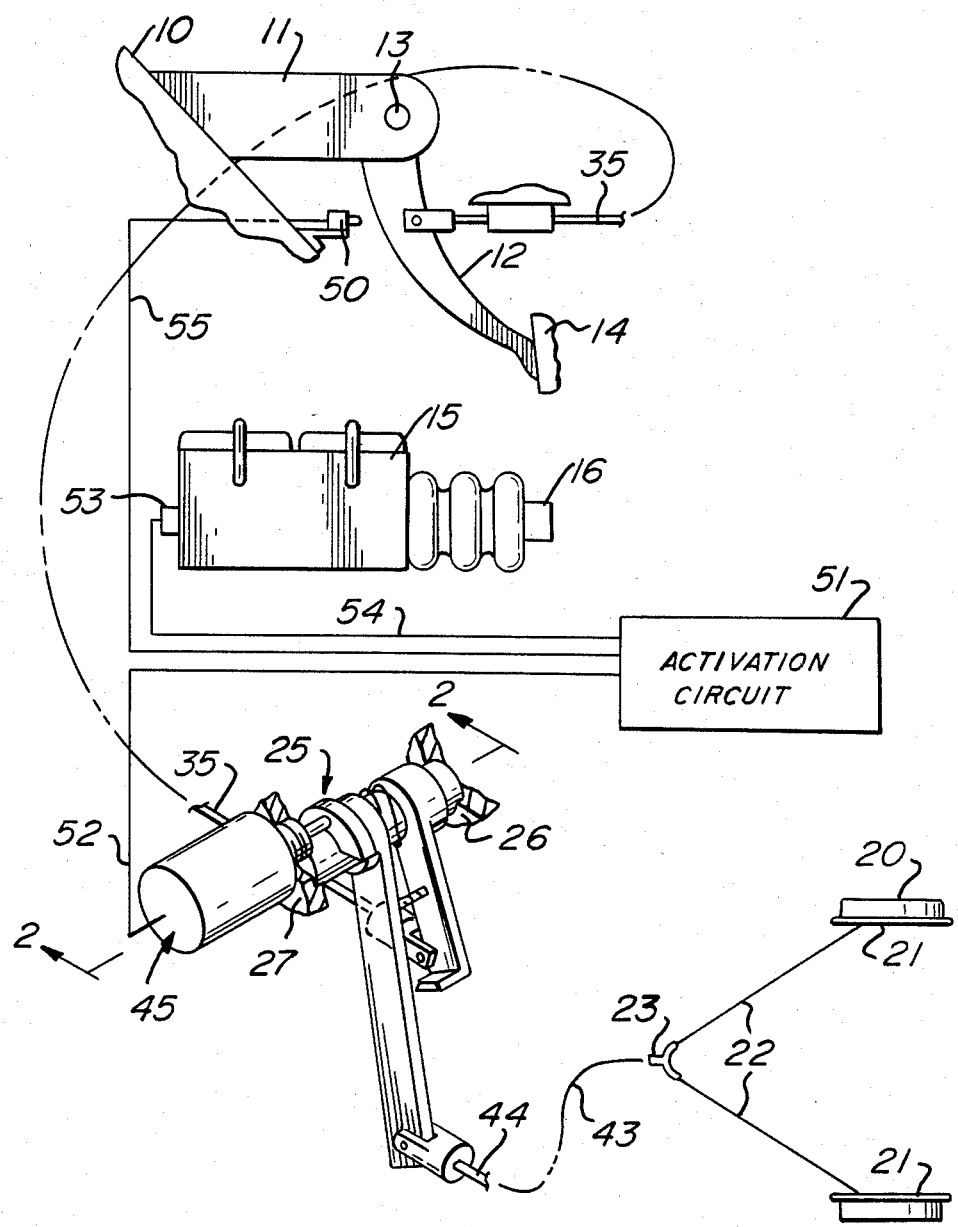
FIG. 1 is a diagrammatic representation of the components of the instant emergency brake system as incorporated in a vehicle.

Referring now more particularly to the drawings, and specifically to FIG. 1 thereof, a motor vehicle is partially illustrated, including a support structure 10, which may be a fire wall, and a mounting bracket 11 extending from the supporting structure. A conventional service brake operator or arm 12 may be pivoted, as at 13, to the mounting bracket 11, and may be provided with a foot actuable member or pedal 14. A hydraulic master cylinder is designated 15, and suitably mounted for operation in the conventional manner by the service brake operator or pedal arm 12, as by depression of the plunger 16. The plunger depression mechanism may be conventional and well known, and is therefore not further shown.

The above described structure may be conventional, and additional conventional structure may include a parking brake apparatus 20, say including a plurality of parking brakes 21 mechanically actuated by tensile members 22, and a tension equalizer 23.

The system of the present invention may be generally designated 25, and may include a pair of laterally spaced mounting members or brackets 26 and 27 suitable fixed as by mounting pads 28 and 29, to a support structure or fire wall 10. An elongate member, rod or shaft 30 may extend in fixed relation between the mounting members or brackets 26 and 27. The shaft 30, at one end thereof adjacent to the bracket 26, may rotatably support a radially outstanding acuator or arm 31. In particular, the radially extending arm 31 may be provided on its inner end with a transverse sleeve or eye 32 rotatably circumposed about the shaft 30 to mount the arm 31 for swinging movement about the axis of the shaft. At its radially outer end, the arm 31 may be provided with a transverse projection, lug or bent portion 33 extending generally parallel to the shaft 30 in the direction away from mounting bracket 26. Additionally, the arm 31 is provided at a location adjacent to its inner end with a transversely projecting spacer member 34, such as a screw, extending generally parallel to the shaft 20 in the same direction as the lug 33 and projecting therebeyond.

The actuator 31 is suitably connected to the service brake operator 12, as by Bowden cable, or other suitable remote operating means, as at 35, so that swinging operating movement of the service brake operator 12 effects corresponding swinging operating movement of the actuator 31. That is, upon depression and release of the pedal 14, through the remote operating connection 35, the actuator is caused to swing back and forth, generally into and out of the paper, or clockwise and counterclockwise, respectively, as seen in FIG. 1.

Also extending generally radially from the shaft 30 is an elongate arm or follower 40. The follower arm 40 includes on its inner end a bearing sleeve, ring or eye 41 rotatably circumposed about the shaft 30 at a location spaced from the sleeve 32 remote from the bracket 26. Thus, the follower sleeve 41 is rotatably circumposed about the shaft 30 in spaced relation intermediate the sleeve 32 and the bracket 27. The follower arm 40 extends radially outwardly from the shaft 30, radially beyond the lug 33 to an outer end 42, where it is provided with suitable adjustable connection means 43, say including a clevis 44 and cable connected to the parking brake apparatus 20, as at the equalizer 23.

As best seen in FIG. 2, the end lug 33 of actuator 31 projects toward and terminates short of the follower 40, while the lateral spacer 34 projects toward the follower arm 40 beyond the lug 33, terminating at a lesser distance from the follower than the lug.

A force applying device 45, such as a solenoid may be fixedly mounted to the bracket 27, say outward thereof away from the shaft 30. The solenoid 45 may include an externally threaded sleeve 46 threadedly engaged into the bracket 27, and a plunger 47 extending through the bracket along and spaced from the shaft 30. The plunger may carry a generally arcuate, or semicircular member or pusher 48 partially circumposed about the shaft 30 and movable along the shaft upon reciprocation of the plunger. The leftward limiting or retracted position of the plunger 47 and pusher 48 is shown in FIG. 2, with the follower sleeve 41 in limiting bearing engagement with the pusher 48. A coil compression spring 49 is circumposed about the shaft 30 between the actuator sleeve 32 and the follower sleeve 41 and has its opposite ends in bearing engagement with the sleeves. The resiliently yieldable, coil compression spring 49 thereby serves ' as holding means to hold apart the sleeves 32 and 41 and their arms 31 and 40.

In normal or properly functioning operation, the actuator 31 is swung back and forth along an angular or arcuate path about the axis of shaft 30 to effect brake application and release. The solenoid or activator 45 remains de-energized with its plunger 47 in fully retracted position and the resilient holding means or spring 49 holds the follower 40 clear or out of the path of the actuator 31. Upon energization of the activator or solenoid 45, as will appear more fully hereinafter, the plunger 47 and pusher 48 urge the follower sleeve 41 rightward, toward the actuator 31, transversely of the actuator path movement. With the service brake operator 12 depressed beyond its normal depressed position, as a result of brake malfunction, the activator 45 is energized by means appearing more fully hereinafter, to urge the follower 40 transversely toward the arcuate path of movement of the actuator 31; and in this actuator position the follower engages the spacer 34 so that follower movement toward the actuator is thereby limited. This transverse follower movement is limited until the service operator is released and the actuator 31 returned to its release position. In this release position of the actuator, the spacer 34 rides off of the follower 40, so that the follower may be shifted by the pusher and against the force of holding spring 49 into the path of actuator movement, beyond the end of lug 33. Upon the next depression of service brake operator 12, the lug 33 will engage the follower 40 to swing the latter with the actuator and thereby operate the parking brake apparatus 20.

Suitable malfunction sensing means such as a microswitch 50, may be located for engagement by the operator 12 upon excessive operator movement, as results from brake failure. The switch or sensor may be connected through conductor means 55 to an activation circuit 51 for energizing the solenoid 45, as through a conductor 52. Alternatively or cumulatively, a sensor 53 may be located to sense hydraulic pressure in the service brake system, as at the master cylinder 15 or otherwise, and may signal, as through a conductor 54, the activation circuit 51 for energizing the activator or solenoid 45.

Thus, upon either excessive movement of operator 12, or insufficient hydraulic pressure in the service brake system, the solenoid 45 is energized to urge the plunger 47 and pusher 48 outward and thereby shift the follower sleeve 41 toward the actuator 31. As mentioned hereinbefore, the follower 40 is shifted toward the actuator 31 to a position limited by the spacer 34 until the actuator is in or returned to its released position. Thereupon the follower 40 is clear of the spacer 34 and shifts into the path of movement of the lug 33.

In this condition, the solenoid 45 may be de-energized and the follower 40 retained in its following relation with the actuator 31 by limiting means generally designated as 60. In particular, the shaft 30 may be formed with a transverse through bore 61 mounting a pin 62 for radially extensile and retractile movement relative to the shaft, being resiliently urged outwardly as by spring 63, and normally retained inwardly by the interior of sleeve 41. However, upon shifting of sleeve 41 clear of pin 62, the latter is projected by spring 63 to a limiting position beyond the shaft 30, which retains the sleeve 41 in its position of movement toward the sleeve 32. Thus, restoration of the follower sleeve 41 to its normal position spaced entirely from the actuator 31 is prevented by the projected limit means or pin 62, and the parking brake apparatus will continue to function in response to actuation of the service brake operator 12.

When the faulty service brake system is repaired, the limit pin 62 may be retracted into shaft 30 and the follower sleeve 41 shifted away from the actuator 31 and again held in this normal, spaced relation by the spring 49. The activation circuit 51 may include suitable timing means, such as a 10 second timer for de-energizing the solenoid after the limit means 60 has become operative.

From the foregoing it is seen that the structure of the present invention serves to effectively synchronize the action of the mechanical or parking brake apparatus to the service or hydraulic brake pedal. This eliminates or minimizes the reaction time required for a driver to realize a malfunction has occured and to apply the parking or emergency brake, while also providing controlled actuation of the parking or mechanical brake system rather than the ratcheting action of a conventional parking brake lever.

Although the present invention has been described in some detail by way of illustration and example for purposes of clarity of understanding, it is understood that certain changes and modifications may be made within the spirit of the invention.

What is claimed is:

1. A normally quiescent automatically energized manually controlled emergency brake system for a vehicle having a service brake operator and a parking brake apparatus, said system comprising a mounting shaft, an actuator rotatably mounted on said shaft and conncted to said service brake operator for back and forth angular movement along a path corresponding to movement of said operator, a follower rotatably mounted on said shaft independently of and adjacent to said actuator for movement longitudinally of said shaft toward and away from said actuator into and out of said path transversely thereof and along said path in following relation with said actuator, follower connection means connecting said follower to said parking brake apparatus for operating the latter upon movement in said following relation, resiliently yieldable holding means operatively connected to said follower to urge said follower longitudinally of said shaft and normally maintain said follower away from said actuator in position out of said path, sensor means for sensing abnormal service brake operator functioning, activator means responsive to said sensor means to urge said follower longitudinally of said shaft against said holding means and into said path and said following relation to operate said parking brake system upon failure of said service brake, and limit means operative upon predetermined yielding of said holding means to limit the restoration thereof and maintain said follower in said following relation.

2. An emergency brake system according to claim 1, said limit means comprising a projection biased radially outwardly of said shaft and normally retained radially inwardly of said shaft by said follower in its non-following position and released to an outwardly projecting position upon follower movement into its following position to retain the follower in its following position.

* * * * *